(12) United States Patent
Kobayashi et al.

(10) Patent No.: US 10,816,073 B2
(45) Date of Patent: Oct. 27, 2020

(54) STRAIN WAVE GEARING

(71) Applicant: HARMONIC DRIVE SYSTEMS INC., Shinagawa-ku, Tokyo (JP)

(72) Inventors: Masaru Kobayashi, Azumino (JP); Akira Maruyama, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 16/477,306

(22) PCT Filed: Nov. 29, 2017

(86) PCT No.: PCT/JP2017/042922
§ 371 (c)(1),
(2) Date: Jul. 11, 2019

(87) PCT Pub. No.: WO2019/106773
PCT Pub. Date: Jun. 6, 2019

(65) Prior Publication Data
US 2020/0032891 A1    Jan. 30, 2020

(51) Int. Cl.
*F16H 33/00*    (2006.01)
*F16H 35/00*    (2006.01)
(Continued)

(52) U.S. Cl.
CPC ................... *F16H 49/001* (2013.01)

(58) Field of Classification Search
CPC .................... F16H 49/001; F16H 2049/003
(Continued)

(56) References Cited

U.S. PATENT DOCUMENTS

| 2,931,248 A | * | 4/1960 | Walton | F16H 49/001 74/640 |
| 2002/0144570 A1 | * | 10/2002 | Goold | F16H 49/001 74/640 |
| 2017/0002914 A1 | * | 1/2017 | Kobayashi | F16H 55/17 |

FOREIGN PATENT DOCUMENTS

| JP | S61548 U | 1/1986 |
| JP | H05141485 A | 6/1993 |

(Continued)

OTHER PUBLICATIONS

International Search Report (with English translation) and Written Opinion issued in corresponding International Patent Application No. PCT/JP2017/042922, 7 pages (dated Feb. 20, 2018).

*Primary Examiner* — Jake Cook
(74) *Attorney, Agent, or Firm* — Buchanan Ingersoll & Rooney PC

(57) ABSTRACT

In a strain wave gearing, a flexible externally toothed gear flexed by a wave generator meshes with a flexible internally toothed gear while in an overlapping meshing state. A floating ring, which supports the internally toothed gear from the outer circumferential side, maintains the overlapping state of the meshing and supports the internally toothed gear in a floating state that allows displacement following a state of radial flexion in the tooth trace direction of the internal teeth of the internally toothed gear. Differences between the meshing states of both gears can be alleviated at each position in the tooth trace direction. Degradation in the transmission characteristics and the strength characteristics of the strain wave gearing caused by manufacturing dimensional accuracy of each component and assembly accuracy can be suppressed.

8 Claims, 5 Drawing Sheets

(51) Int. Cl.
*F16H 37/00* (2006.01)
*F16H 49/00* (2006.01)

(58) Field of Classification Search
USPC .......................................................... 74/640
See application file for complete search history.

(56) References Cited

FOREIGN PATENT DOCUMENTS

| | | |
|---|---|---|
| JP | H05141486 A | 6/1993 |
| JP | 2011144916 A | 7/2011 |

* cited by examiner

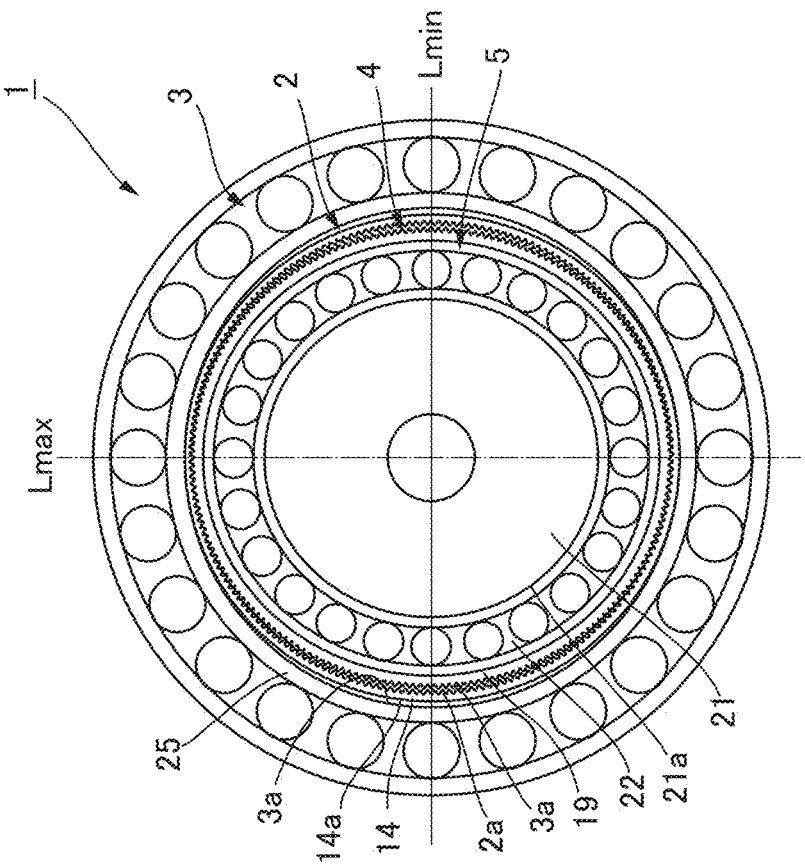
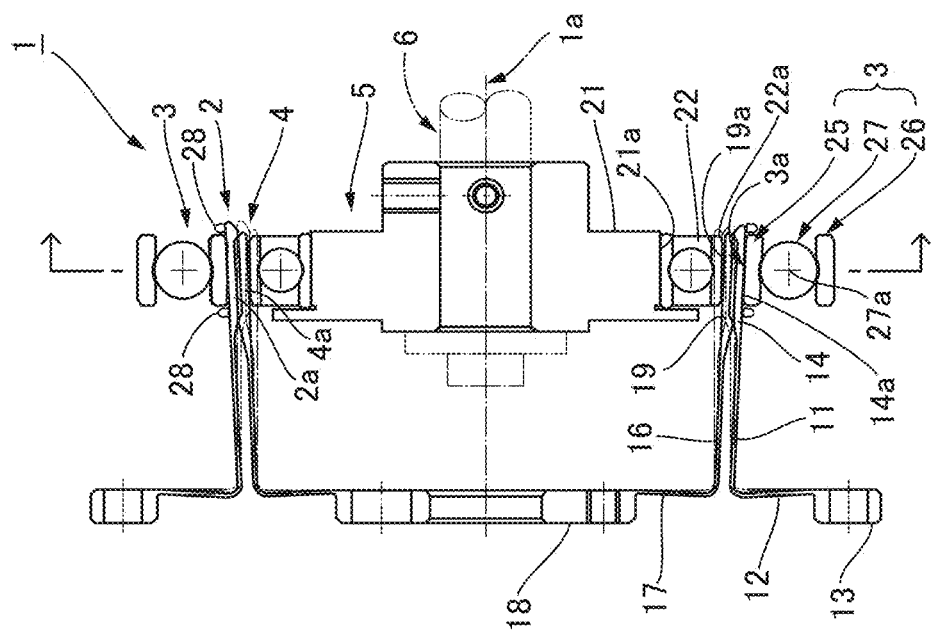

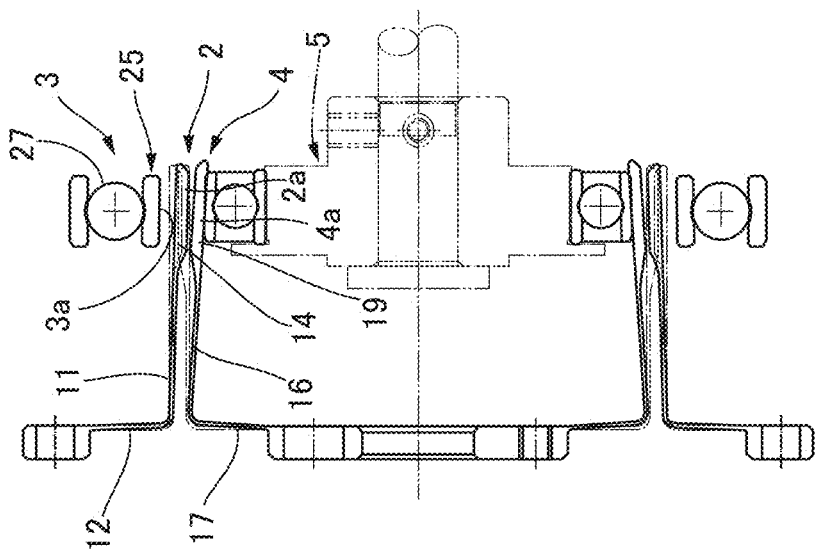
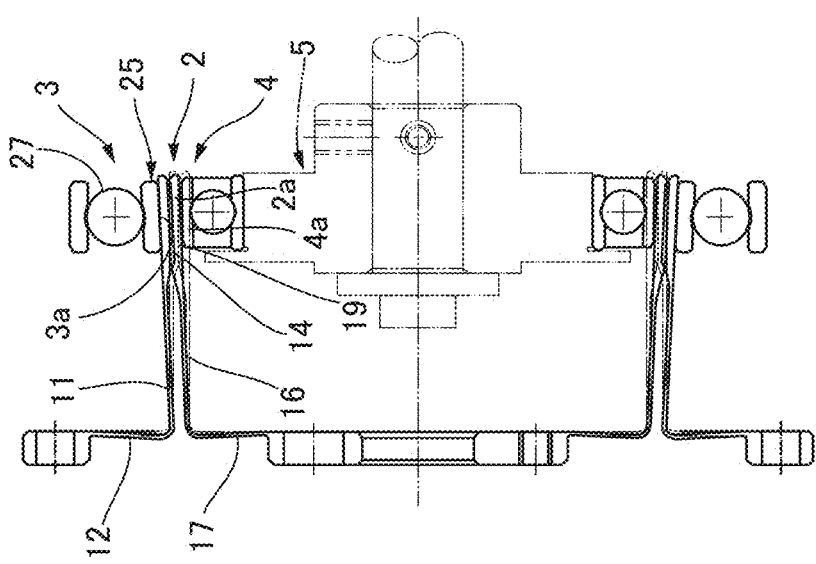
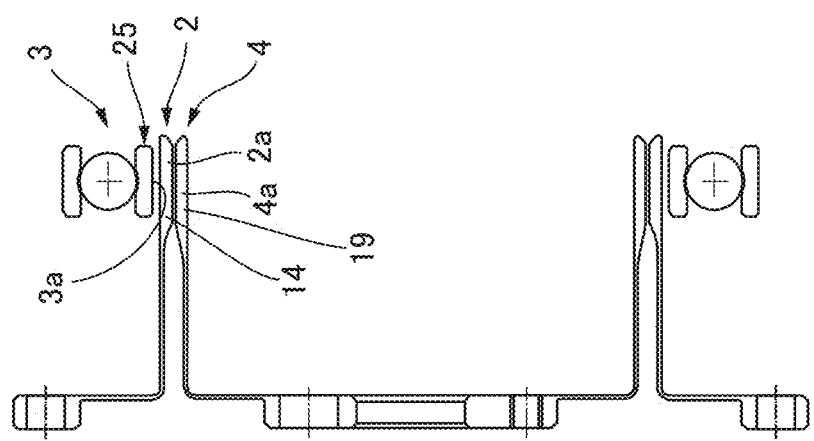

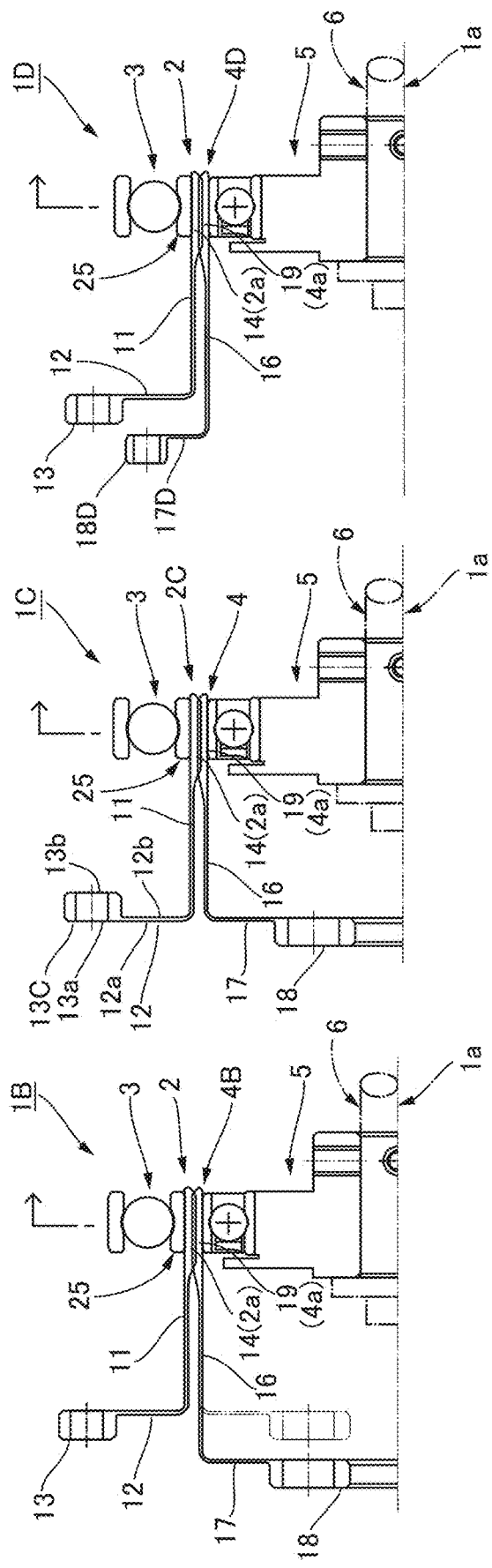

STRAIN WAVE GEARING

TECHNICAL FIELD

The present invention relates to a strain wave gearing, and in particular relates to a strain wave gearing provided with a flexible internally toothed gear and a flexible externally toothed gear.

BACKGROUND ART

Typically, in strain wave gearings used as reducers, etc., a flexible externally toothed gear is disposed inside a rigid internally toothed gear, and the externally toothed gear is caused to flex in an ellipsoidal shape by a wave generator and to mesh with the internally toothed gear. When the wave generator is caused to rotate by a motor, etc., meshing positions of the two gears move along a circumferential direction. As a result, relative rotation is produced between the two gears, the relative rotation being reduced by a prescribed reduction ratio that corresponds to a difference in the number of teeth of the two gears. One of the gears is secured so as not to rotate, whereby reduced rotation is derived from the other gear.

In a cup-shaped or top-hat-shaped externally toothed gear used as the externally toothed gear, portions of external teeth formed on an open-end side of a cylinder part are flexed in an ellipsoidal shape by the wave generator, and the external teeth mesh with internal teeth of a perfectly circular rigid internally toothed gear on and near a major axis of the ellipsoidal shape. The meshing on and near the major axis is not uniform in a tooth trace direction; rather, this meshing is deeper on the open side and shallower on a diaphragm side due to the effect of coning in the cup shape or top-hat shape. Due to this meshing, transmission characteristics and strength characteristics of the strain wave gearing are especially susceptible to effects of dimensional precision in manufacturing and precision in assembly of the components.

For the purpose of mitigating this difference in axial-direction meshing, there are known methods for applying pronounced relieving and for applying tooth-profile shifting to the external teeth of the externally toothed gear that are formed on the open side along the tooth trace direction. There are also known unit-type strain wave gearings for the purpose of maintaining assembly precision. However, these are not sufficient. For example, Patent Document 1 discloses a strain wave gearing in which a shifted tooth profile is used, and also discloses coning of a cup-shaped externally toothed gear.

PRIOR ART DOCUMENTS

Patent Documents

Patent Document 1: JP-A 2011-144916

SUMMARY OF THE INVENTION

Problems to be Solved by the Invention

In view of the above, an object of the present invention is to provide a strain wave gearing in which it is possible to improve a meshing state in a tooth trace direction between an externally toothed gear and an internally toothed gear.

Means of Solving the Problems

In order to achieve the object described above, the strain wave gearing of the present invention is configured so that a flexible internally toothed gear capable of flexing in a radial direction is adopted as an internally toothed gear, and so that a flexible externally toothed gear that is caused to flex in a non-circular shape by a wave generator is caused to mesh with the internally toothed gear in an overlapping meshing state. The flexible internally toothed gear is supported from the outer peripheral side, and the state of meshing with the externally toothed gear is maintained.

Specifically, the strain wave gearing of the present invention is characterized by having:

a flexible internally toothed gear capable of flexing in a radial direction;

a support mechanism provided with a supporting inner peripheral surface for supporting the internally toothed gear from the outer peripheral side;

a flexible externally toothed gear disposed concentrically inside the internally toothed gear; and a wave generator fitted inside the externally toothed gear so as to be capable of relative rotation, the wave generator causing the externally toothed gear to flex in a non-circular shape and pushing the externally toothed gear toward the internally toothed gear supported by the supporting inner peripheral surface, thereby causing the externally toothed gear to mesh with the internally toothed gear at a plurality of locations that are set apart in a circumferential direction, a meshing state of external teeth of the externally toothed gear relative to internal teeth of the internally toothed gear being an overlapping meshing state in which pitch circles of the internal teeth and the external teeth overlap each other.

In the present invention, the flexible internally toothed gear and the flexible externally toothed gear mesh with each other in an overlapping meshing state. Any difference in meshing between the two gears at tooth-trace-direction positions is mitigated. It is possible to suppress reductions in transmission characteristics and strength characteristics of the strain wave gearing caused by the effects of dimensional precision in manufacturing and precision in assembly of the components.

The present invention is suitable for use in cup-type or top-hat-type strain wave gearings in which the meshing state of the two gears in the tooth trace direction changes due to flexing referred to as "coning" of the cup-shaped or top-hat-shaped externally toothed gear.

In a cup-type or top-hat-type strain wave gearing, the externally toothed gear is a cup-shaped or top-hat-shaped externally toothed gear provided with an externally-toothed-gear cylinder part capable of flexing in a radial direction, an externally-toothed-gear diaphragm that extends radially outward or radially inward from one end of the externally-toothed-gear cylinder part, and external teeth formed on an outer peripheral surface portion on the other-end side of the externally-toothed-gear cylinder part. The internally toothed gear is a cup-shaped or top-hat-shaped internally toothed gear provided with an internally-toothed-gear cylinder part capable of flexing in the radial direction, an internally-toothed-gear diaphragm that extends radially outward or radially inward from one end of the internally-toothed-gear cylinder part, and internal teeth formed on an inner peripheral surface portion on the other-end side of the internally-toothed-gear cylinder part.

The support mechanism has a floating ring provided with the supporting inner peripheral surface that supports an outer peripheral surface of an internal tooth formation portion in which the internal teeth in the internally-toothed-gear cylinder part are formed, the supporting ring being in a floating state that allows displacement following a state of radial flexing in tooth-trace-direction positions on the internal teeth. The inner diameter of the floating ring is set on the basis of the outer diameter of the internal tooth formation portion caused to flex in a non-circular shape by the wave generator via the externally toothed gear.

Furthermore, the wave generator is fitted inside an external tooth formation portion in which the external teeth in the externally-toothed-gear cylinder part are formed, the wave generator being fitted so as to be capable of relative rotation, and the wave generator causing the external tooth formation portion to flex in a non-circular shape and pushing the external tooth formation portion toward the internal tooth formation portion supported by the circular inner peripheral surface of the floating ring.

In the strain wave gearing of the present invention, the externally toothed gear caused to flex by the wave generator meshes with the internally toothed gear in an overlapping meshing state. The floating ring supporting the internally toothed gear from the outer peripheral side maintains the overlapping meshing state and supports the internally toothed gear in a floating state that enables displacement in a manner following a state of radial flexing in the tooth trace direction of the internal teeth of the internally toothed gear. It is possible to mitigate any difference in meshing state between the two gears at tooth-trace-direction positions. It is also possible to suppress reductions in transmission characteristics and strength characteristics of the strain wave gearing caused by the effects of dimensional precision in manufacturing and precision in assembly of the components.

The wave generator typically causes the external tooth formation portion to flex in an ellipsoidal shape and causes the external teeth to mesh with the internal teeth at positions on both major-axis-direction ends of the ellipsoidal shape. In this case, the inner diameter of the supporting inner peripheral surface of the floating ring is set on the basis of a major diameter of the outer peripheral surface of the internal tooth formation portion caused to flex in an ellipsoidal shape by the wave generator via the external tooth formation portion. Appropriately setting the inner diameter of the floating ring makes it possible to prevent increases in rotational torque of the wave generator.

The support mechanism is provided with a ring support part in order to support the floating ring in a floating state. The ring support part supports the floating ring in a state that enables both axial-direction side portions of the floating ring to be radially displaced about positions midway along the axial direction in the outer peripheral surface of the floating ring.

For example, it is possible to use, as the support mechanism, a cylinder member provided with an inner-side cylinder and an outer-side cylinder that are disposed concentrically, and an annular web that links the inner-side cylinder and the outer-side cylinder, the cylinder member having a cross-section in the shape of the letter H. In this case, the inner-side cylinder in the cylinder member is the floating ring, and the annular web and the outer-side cylinder in the cylinder member are the ring support part.

In addition, a ball bearing can be used as the support mechanism. In this case, an inner race in the ball bearing is the floating ring, and balls and an outer race in the ball bearing are the ring support part.

Furthermore, it is desirable to provide an elastic body that restricts movement of the floating ring in the axial direction.

BRIEF DESCRIPTION OF THE DRAWINGS

FIG. 1A is a schematic longitudinal cross-sectional view of a strain wave gearing to which the present invention is applied;

FIG. 1B is a schematic transverse cross-sectional view of the strain wave gearing in FIG. 1A;

FIG. 3A is a longitudinal cross-sectional view of the internally toothed gear and the externally toothed gear before the same are flexed in an ellipsoidal shape by a wave generator;

FIG. 3B is a longitudinal cross-sectional view of a cross-section that includes a major axis of the internally toothed gear and the externally toothed gear in a state in which the same are flexed in an ellipsoidal shape by the wave generator;

FIG. 3C is a longitudinal cross-sectional view of a cross-section that includes a minor axis of the internally toothed gear and the externally toothed gear in a state in which the same are flexed in an ellipsoidal shape by the wave generator;

FIG. 4B is a half cross-sectional view of another example of the strain wave gearing;

FIG. 4C is a half cross-sectional view of another example of the strain wave gearing; and FIG. 4D is a half cross-sectional view of another example of the strain wave gearing.

MODE FOR CARRYING OUT THE INVENTION

Figure 2:
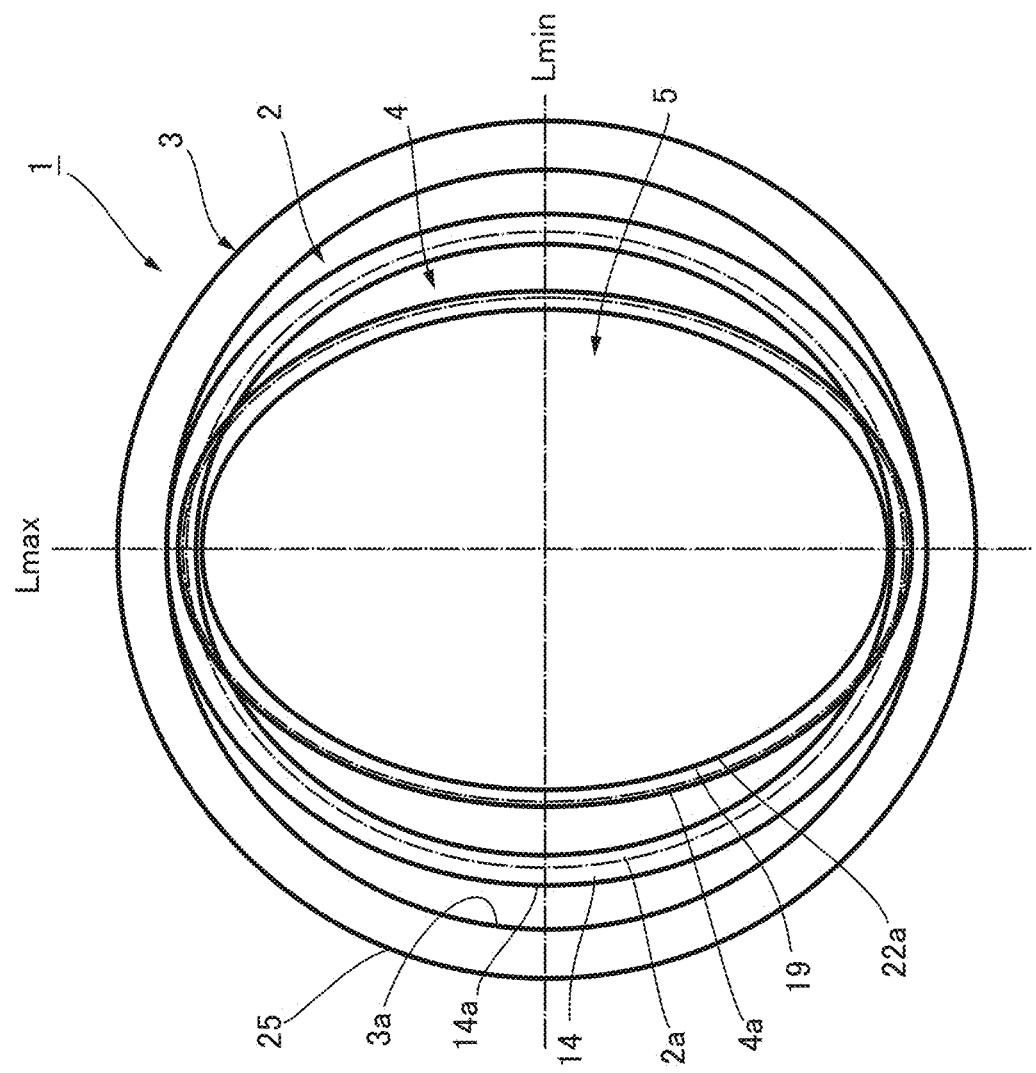
FIG. 2 is a diagram showing a flexed state of an internally toothed gear and an externally toothed gear.

Embodiments of a strain wave gearing to which the present invention is applied are described below with reference to the accompanying drawings. FIG. 1A is a schematic longitudinal cross-sectional view of a strain wave gearing according to an embodiment, and FIG. 1B is a schematic transverse cross-sectional view of the strain wave gearing. FIG. 2 is a diagram in which a state of flexing of the components of the strain wave gearing is exaggerated. The strain wave gearing 1 is provided with a flexible internally toothed gear 2 capable of flexing in a radial direction, a support mechanism 3 provided with a circular supporting inner peripheral surface 3a for supporting the internally toothed gear 2 from an outer peripheral side, a flexible externally toothed gear 4 disposed concentrically inside the internally toothed gear 2, and a wave generator 5.

The wave generator 5 is fitted inside the externally toothed gear 4 so as to be capable of relative rotation, the wave generator 5 causing the externally toothed gear 4 to flex in a non-circular shape, pushing the externally toothed gear 4 toward the internally toothed gear 2 supported by the supporting inner peripheral surface 3a, and causing the externally toothed gear 4 to mesh with the internally toothed gear 2 at a plurality of locations that are set apart in a circumferential direction. A meshing state of external teeth 4a of the externally toothed gear 4 relative to internal teeth 2a of the internally toothed gear 2 is set as an overlapping meshing state in which pitch circles of the internal teeth 2a and the external teeth 4a overlap each other.

The internally toothed gear 2 is a top-hat-shaped internally toothed gear. The internally toothed gear 2 is provided with an internally-toothed-gear cylinder part 11 capable of flexing in the radial direction, a discoid internally-toothed-gear diaphragm 12 that extends radially outward from a rear end that is one end of the internally-toothed-gear cylinder part 11, and a rigid annular boss 13 formed on an outer peripheral end of the internally-toothed-gear diaphragm 12. In the internally-toothed-gear cylinder part 11, a cylindrical portion having a prescribed length from an open end that is the other end of the internally-toothed-gear cylinder part 11 is an internal tooth formation portion 14. The internal teeth 2a are formed on an inner peripheral surface of the internal tooth formation portion 14.

The externally toothed gear 4 is a cup-shaped externally toothed gear. The externally toothed gear 4 is provided with an externally-toothed-gear cylinder part 16 capable of flexing in the radial direction, a discoid externally-toothed-gear diaphragm 17 that extends radially inward from a rear end that is one end of the externally-toothed-gear cylinder part 16, and a rigid annular boss 18 formed on an inner peripheral end of the externally-toothed-gear diaphragm 17. In the externally-toothed-gear cylinder part 16, a cylindrical portion having a prescribed length from an open end that is the other end of the externally-toothed-gear cylinder part 16 is an external tooth formation portion 19. The external teeth 4a are formed on an outer peripheral surface of the external tooth formation portion 19.

The wave generator 5 is fitted coaxially inside the external tooth formation portion 19 of the externally toothed gear 4. The wave generator 5 is provided with a rigid cam plate 21 and a wave bearing 22. The wave bearing 22 is mounted between an ellipsoidal outer peripheral surface 21a of the cam plate 21 and an inner peripheral surface 19a of the external tooth formation portion 19 of the externally toothed gear 4. A ball bearing is used as the wave bearing 22. The wave bearing 22 is mounted on the ellipsoidal outer peripheral surface 21a of the cam plate 21 and is caused to flex in an ellipsoidal shape.

As shall be apparent from FIG. 2, the external tooth formation portion 19 of the externally toothed gear 4 is caused to flex in an ellipsoidal shape by an outer race 22a of the ellipsoidally flexed wave bearing 22. The internal tooth formation portion 14 of the internally toothed gear 2 also is caused to flex radially outward by the external tooth formation portion 19 and is flexed in an ellipsoidal shape overall. The external teeth 4a mesh with the internal teeth 2a on and near a major axis Lmax of the ellipsoidally flexed external tooth formation portion 19. The meshing state of the external teeth 4a relative to the internal teeth 2a is set as an overlapping meshing state in which the pitch circles of meshing of these teeth overlap each other, as indicated by dash-dotted lines. However, near a minor axis Lmin of the ellipsoidal shape, the external teeth 4a do not mesh with the internal teeth 2a, and an outer peripheral surface of the internal tooth formation portion 14 is slightly set apart from the supporting inner peripheral surface 3a of the support mechanism 3.

As shown in FIG. 1, an input shaft 6 is connected and secured to a center part of the cam plate 21 in a coaxial manner, the input shaft 6 receiving rotation as input from a motor, etc. When the cam plate 21 is rotated by the input shaft 6, meshing positions of the external teeth 4a relative to the internal teeth 2a move along a circumferential direction. The number of internal teeth 2a is different from the number of external teeth 4a. Relative rotation that corresponds to the difference in the number of teeth is produced between the two gears 2, 4. For example, when the internally toothed gear 2 is secured so as not to rotate, reduced rotation can be derived from the externally toothed gear 4.

The support mechanism 3 is provided with a floating ring 25. An inner peripheral surface of the floating ring 25 is the supporting inner peripheral surface 3a. The floating ring 25 supports an outer peripheral surface 14a of the internal tooth formation portion 14 of the internally toothed gear 2 in a floating state that enables displacement in a manner following radial flexing in tooth-trace-direction positions on the internal teeth 2a. The inside diameter of the supporting inner peripheral surface 3a of the floating ring 25 is set on the basis of a major diameter of the outer peripheral surface of the internal tooth formation portion 14 caused to flex in a non-circular shape, specifically an ellipsoidal shape in the present example, by the wave generator 5 via the externally toothed gear 4.

The support mechanism 3 in the present example is configured using a ball bearing. The support mechanism 3 is provided with: the floating ring 25, which functions as an inner race having a prescribed width; an outer race 26 having a prescribed width; and a plurality of balls 27 mounted between the floating ring 25 and the outer race 26 in a rollable state. The floating ring 25 functioning as an inner race is configured such that, in a direction of an axis 1a (tooth trace direction of the internal teeth), both ends can be radially displaced about the positions of ball centers 27a. More specifically, the floating ring 25 is supported in a floating state by a ring support part composed of the outer race 26 and the balls 27.

Thrust from the externally toothed gear 4 acts on the floating ring 25. It is desirable that the floating ring 25 does not deviate in the direction of the axis 1a relative to the internal tooth formation portion 14 due to the thrust. For example, elastic bodies 28, e.g., elastic rings are attached to the outer peripheral surface of the internal tooth formation portion 14, and the elastic bodies 28 prevent movement of the floating ring 25. The elastic bodies 28 are formed from, for example, rubber, plastic, etc., and are configured as low-rigidity members so as not to inhibit the flexibility of the internal tooth formation portion 14. The outer race 26 may be retained by a fixed-side member (not shown) so as not to move in the direction of the axis 1a.

FIGS. 3A, 3B, and 3C are diagrams showing flexed states (coning) of the internally toothed gear 2 and the externally toothed gear 4 of the strain wave gearing 1. FIG. 3A shows a state prior to flexing, FIG. 3B shows a cross-section that includes the major axis in a state of being flexed in an ellipsoidal shape, and FIG. 3C shows a cross-section that includes the minor axis in a state of being flexed in an ellipsoidal shape.

As shown in FIG. 3A, in a state before the wave generator 5 is mounted, the internal tooth formation portion 14 of the internally toothed gear 2 and the external tooth formation portion 19 of the externally toothed gear 4 are perfectly circular, and the internal teeth 2a and the external teeth 4a do not mesh.

As shown in FIG. 3B, in a cross-section that includes the major axis Lmax, the external tooth formation portion 19 of the externally toothed gear 4 flexes radially outward due to the wave generator 5. The amount of flexing increases as the distance from the externally-toothed-gear diaphragm 17 toward the open end from the externally-toothed-gear-diaphragm 17 side increases.

The internal tooth formation portion 14 on which are formed the internal teeth 2a that mesh with the external teeth 4a is caused to flex radially outward by the wave generator 5 via the external tooth formation portion 19, and is pushed toward the supporting inner peripheral surface 3a of the floating ring 25. The floating ring 25 supports the internal tooth formation portion 14 from the outer peripheral side in a floating state. The supporting inner peripheral surface 3a of the floating ring 25 is restricted from flexing in the radial direction of the internal tooth formation portion 14, and the inner diameter of the supporting inner peripheral surface 3a is set so that the overlapping meshing between the internal teeth 2a and the external teeth 4a is not disengaged.

The amount of radially outward flexing in the internal tooth formation portion 14 similarly increases as the distance from the internally-toothed-gear diaphragm 12 toward the open end from the internally-toothed-gear-diaphragm 12 side increases. The floating ring 25 follows the flexed state of the internal teeth 2a while the overlapping meshing state between the internal teeth 2a and the external teeth 4a is maintained, and the open-end-side end is displaced further radially outward about the balls 27 than is the end on the internally-toothed-gear-diaphragm 12 side.

Accordingly, the internal teeth 2a can be made to mesh in a state that follows the flexed state of the external teeth 4a. Specifically, it is possible to mitigate any difference in meshing between the two sets of teeth 2a, 4a in the tooth trace direction. As a result, a preload force decreases, the meshing area per tooth can be increased, and the number of teeth meshing in the circumferential direction can also be increased. This reduces rotational variation (rotation current ripple, angular transmission error) of the strain wave gearing 1, and improves in the tooth root strength and the wear resistance of the two gears.

As shown in FIG. 3C, in a cross-section that includes the minor axis Lmin, the internal tooth formation portion 14 of the internally toothed gear 2 and the external tooth formation portion 19 of the externally toothed gear 4 enter a state of being flexed radially inward. The external teeth 4a are slightly set apart from the internal teeth 2a, and the teeth do not mesh. The outer peripheral surface of the internal tooth formation portion 14 is also slightly set apart from the supporting inner peripheral surface 3a of the floating ring 25.

(Other Example of Floating Ring)

Figure 4A:
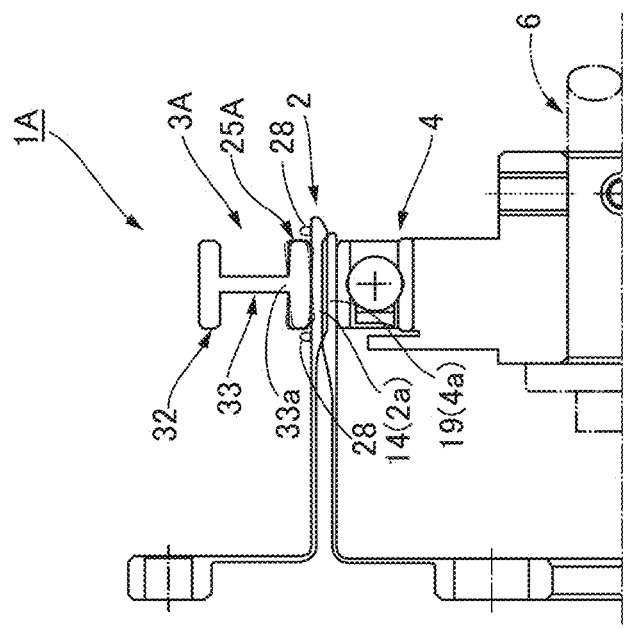
FIG. 4A is a half cross-sectional view of a strain wave gearing provided with a floating ring having a different configuration.

FIG. 4A is a schematic half cross-sectional view of another example of a floating ring 25 in the strain wave gearing 1 described above. A support mechanism 3A in a strain wave gearing 1A shown in FIG. 4A is configured from a cylinder body having a cross-section in the shape of the letter H. Specifically, the support mechanism 3A is provided with: an inner-side cylinder having a prescribed width, said cylinder being a floating ring 25A; an outer-side cylinder 32 having a prescribed width, the outer-side cylinder 32 concentrically surrounding the floating ring 25A; and an annular web 33 that links the floating ring 25A and the outer-side cylinder 32.

The annular web 33 and the outer-side cylinder 32 in the support mechanism 3A function as a ring support part that supports the floating ring 25A in a floating state. The floating ring 25A can be radially displaced in a manner following flexing of the internal tooth formation portion 14, the floating ring 25A being displaced about an inner peripheral end part 33a of the web 33. The configuration of the strain wave gearing 1A is identical to that of the strain wave gearing 1 described above except in regard to the support mechanism.

(Other Examples of Internally Toothed Gear and Externally Toothed Gear)

In the strain wave gearing 1 described above, the distance from the internally-toothed-gear diaphragm 12 to the internal tooth formation portion 14 in the internally toothed gear 2, e.g., the length from the internally-toothed-gear diaphragm 12 to the tooth-trace-direction center in the internal teeth 2a of the internal tooth formation portion 14, is substantially equal to the length from the externally-toothed-gear diaphragm 17 in the externally toothed gear 4 to the center of the external teeth 4a in the external tooth formation portion 19. As the length of the externally-toothed-gear cylinder part 16 of the externally toothed gear 4 positioned on the inner peripheral side is increased over the length of the internally-toothed-gear cylinder part 11 of the internally toothed gear 2 positioned on the outer peripheral side, any difference in tooth-trace-direction meshing depth between the internal teeth 2a and the external teeth 4a is commensurately mitigated. For example, in a strain wave gearing 1B shown in FIG. 4B, the length of the externally-toothed-gear cylinder part 16 of an externally toothed gear 4B on an inner peripheral side is increased over the length of the internally-toothed-gear cylinder part 11 of the internally toothed gear 2.

FIG. 4C is a schematic half cross-sectional view of another example of the flexible internally toothed gear 2 in the strain wave gearing 1 described above. An internally toothed gear 2C of a strain wave gearing 1C shown in FIG. 4C is provided with an internally-toothed-gear cylinder part 11 provided with an internal tooth formation portion 14, a discoid internally-toothed-gear diaphragm 12 that extends radially outward from a rear end that is one end of the internally-toothed-gear cylinder part 11, and a rigid annular boss 13C. The boss 13C is formed on an outer peripheral edge of the internally-toothed-gear diaphragm 12 in such a state as to protrude toward an open end that is the other end of the internally-toothed-gear cylinder part 11.

Specifically, an end surface 12a on a rear-end side of the internally-toothed-gear diaphragm 12 and an end surface 13a on a rear-end side of the boss 13C are positioned on the same plane. An end surface 13b on an open-end side of the boss 13C is at a position that juts further toward the open end than an end surface 12b on an open-end side of the internally-toothed-gear diaphragm 12. The configuration of the strain wave gearing 1C is identical to that of the strain wave gearing 1 described above except in regard to the internally toothed gear 2C.

FIG. 4D is a schematic half cross-sectional view of another example in which a top-hat-shaped externally toothed gear 4D is used as the flexible externally toothed gear 4 in the strain wave gearing 1 described above. The externally toothed gear 4D of a strain wave gearing 1D shown in FIG. 4D is provided with an externally-toothed-gear cylinder part 16 that is provided with an external tooth formation portion 19, a discoid externally-toothed-gear diaphragm 17D that extends radially outward from a rear end that is one end of the externally-toothed-gear cylinder part 16, and a rigid annular boss 18D formed on an outer peripheral edge of the externally-toothed-gear diaphragm 17D. The configuration of the strain wave gearing 1D is identical to that of the strain wave gearing 1 described above except in regard to the externally toothed gear 4D.

The invention claimed is:

1. A strain wave gearing comprising:
a flexible internally toothed gear capable of flexing in a radial direction;
a support mechanism provided with a supporting inner peripheral surface for supporting the internally toothed gear from an outer peripheral side thereof;
a flexible externally toothed gear disposed concentrically inside the internally toothed gear; and
a wave generator fitted inside the externally toothed gear so as to be capable of rotating relative to the externally toothed gear, the wave generator causing the externally toothed gear to flex in a non-circular shape and pushing the externally toothed gear toward the internally toothed gear supported by the supporting inner peripheral surface, and causing the externally toothed gear to mesh with the internally toothed gear at a plurality of locations that are set apart in a circumferential direction, a meshing state of external teeth of the externally toothed gear relative to internal teeth of the internally toothed gear being an overlapping meshing state in which pitch circles of the internal teeth and the external teeth overlap each other.

2. The strain wave gearing according to claim 1, wherein the internally toothed gear is a cup-shaped or top-hat-shaped internally toothed gear provided with an internally-toothed-gear cylinder part capable of flexing in the radial direction, an internally-toothed-gear diaphragm that extends radially outward or radially inward from one end of the internally-toothed-gear cylinder part, and internal teeth formed on an inner peripheral surface portion on the other-end side of the internally-toothed-gear cylinder part;

the support mechanism has a floating ring provided with the supporting inner peripheral surface that supports an outer peripheral surface of an internal tooth formation portion in which the internal teeth in the internally-toothed-gear cylinder part are formed, the supporting ring being in a floating state that allows displacement following a state of radial flexing in each position of the internal teeth along a tooth trace direction; and an inner diameter of the floating ring is set based on an outer diameter of the internal tooth formation portion that is caused to flex in the non-circular shape by the wave generator via the externally toothed gear.

3. The strain wave gearing according to claim 2, wherein the externally toothed gear is a cup-shaped or top-hat-shaped externally toothed gear provided with an externally-toothed-gear cylinder part capable of flexing in a radial direction, an externally-toothed-gear diaphragm that extends radially outward or radially inward from one end of the externally-toothed-gear cylinder part, and external teeth formed on an outer peripheral surface portion on the other-end side of the externally-toothed-gear cylinder part; and the wave generator is fitted inside an external tooth formation portion in which the external teeth in the externally-toothed-gear cylinder part are formed, the wave generator being fitted inside the external tooth formation portion so as to be capable of rotating relative to the external tooth formation portion, and the wave generator causing the external tooth formation portion to flex in a non-circular shape and pushing the external tooth formation portion toward the internal tooth formation portion supported by the circular inner peripheral surface of the floating ring.

4. The strain wave gearing according to claim 3, wherein the wave generator causes the external tooth formation portion to flex in an ellipsoidal shape and causes the external teeth to mesh with the internal teeth at positions on both major-axis-direction ends of the ellipsoidal shape; and an inner diameter of the supporting inner peripheral surface of the floating ring is set based on a major diameter of the outer peripheral surface of the internal tooth formation portion caused to flex in the ellipsoidal shape by the wave generator via the external tooth formation portion.

5. The strain wave gearing according to claim 2, wherein the floating ring is a ring having a prescribed width in an axial direction of the internally toothed gear;

the support mechanism has a ring support part for supporting the floating ring; and the ring support part is configured to support the floating ring in a state that enables both axial-direction side portions of the floating ring to be radially displaced about positions midway along the axial direction in an outer peripheral surface of the floating ring.

6. The strain wave gearing according to claim 5, wherein the support mechanism is a cylinder member provided with an inner-side cylinder and an outer-side cylinder that are disposed concentrically, and an annular web that links the inner-side cylinder and the outer-side cylinder, the cylinder member having a cross-section in the shape of a letter H;

the inner-side cylinder in the cylinder member is the floating ring; and the annular web and the outer-side cylinder in the cylinder member are the ring support part.

7. The strain wave gearing according to claim 5, wherein the support mechanism has a ball bearing;

an inner race in the ball bearing is the floating ring; and balls and an outer race in the ball bearing are the ring support part.

8. The strain wave gearing according to claim 2, further comprising:

an elastic body to restrict movement of the floating ring in an axial direction of the internally toothed gear.

* * * * *